Sept. 26, 1950  H. E. TOWNSEND  2,523,402
BICYCLE HANDLE BAR SUPPORT
Filed June 19, 1948

INVENTOR
HAROLD EUGENE TOWNSEND
BY
ATTORNEY

Patented Sept. 26, 1950

2,523,402

UNITED STATES PATENT OFFICE 2,523,402

BICYCLE HANDLE BAR SUPPORT

Harold Eugene Townsend, Elmira, N. Y., assignor to Trayer Products, Incorporated, Elmira, N. Y., a corporation of New York Application June 19, 1948, Serial No. 33,990

1 Claim. (Cl. 74—551.2)

It is customary to mount the handle bar of a bicycle on a support comprising a head providing a split eye receiving the bar and a post integral therewith designed to enter the front member of the frame in the interior of which it is secured by appropriate means to a tube or rod extending to the fork carrying the front wheel, so that as the handle bar is turned in either direction to steer the bicycle the wheel will correspondingly turned. Such supports are relatively costly to manufacture and because of their rigid construction transmit to the handle bars and so to the hands and arms of the rider vibrations and shocks sustained by the front wheel as the bicycle is being ridden.

It is therefore an object of my invention to provide a novel form of handle bar support which while fully effective for its primary purpose likewise is capable of absorbing to a considerable extent vibrations and shocks sustained by the front wheel and consequently of minimizing their transmission to the handle bar, yet which can be manufactured and marketed at a considerably lower cost than the headed solid supports hitherto mentioned as normally employed.

Other objects and novel features of design, construction and arrangement comprehended by my invention are hereafter more particularly pointed out or will be apparent from the following description of two embodiments thereof as illustrated in the accompanying drawing in which.

Figures 1, 2:
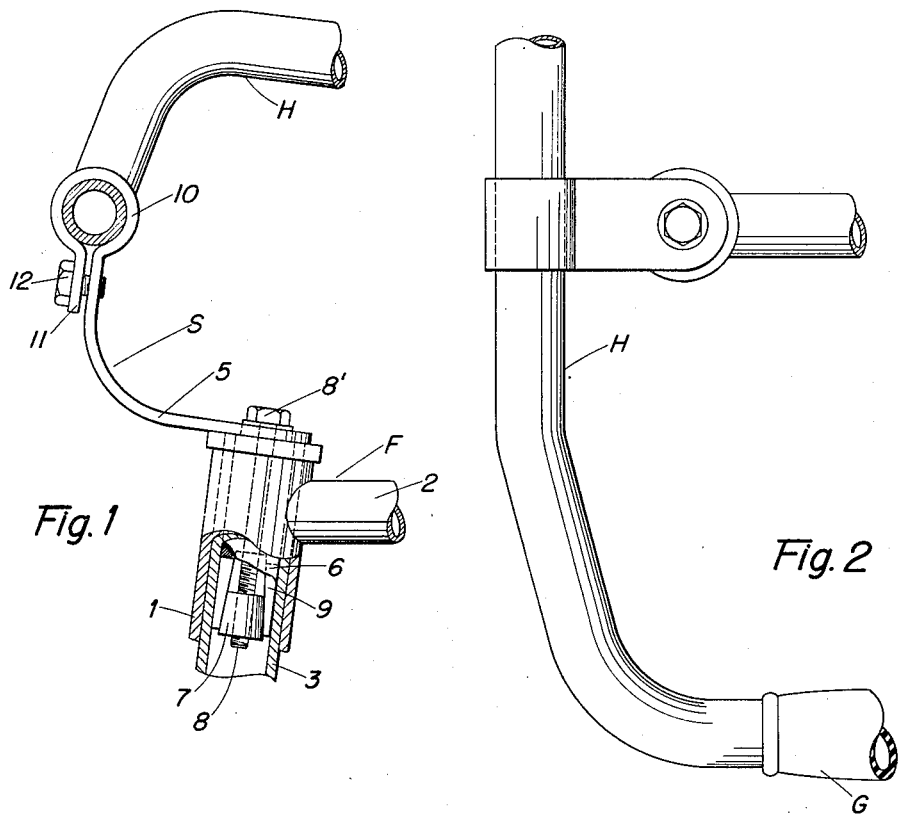
Fig. 1 is a side view of one of said embodiments operatively assembled with a handle bar and bicycle frame, the several parts being shown partially in side elevation and partially in vertical section.
Fig. 2 is a top plan view of the assembly shown in Fig. 1 with a portion of the right hand end of the handle bar broken away.

Referring first more particularly to Figs. 1 and 2, the frame F of the bicycle is shown as of conventional design and thus comprises a front tubular member 1 and an upper horizontal member 2, while a steering tube 3 housed within the front member extends downwardly to the wheel-carrying front fork (not shown) of the bicycle in the usual way. The handle bar H likewise of conventional design is located above the frame and connected with the steering tube through the medium of the support of my invention, generally designated as S.

Essentially this support comprises a resilient leaf 5 directly supporting the handle bar and a post 6 adapted to enter front frame member 1 and steering tube 3 to which it is connected in non-rotatable relation by any appropriate means; these means, desirably and as shown, may comprise an internally bored and threaded cone 7 through which extends the lower threaded end of a bolt 8 the head 8' of which seats against the upper end of the post which latter is hollow and at its lower end internally beveled in correspondence to the slope of the cone. Thus after the post is entered in the steering tube with the bolt backed off the cone can be drawn up into the post through the medium of the bolt to expand the lower end of the post in the tube so as to lock it thereto, the wall of the post proximate its lower end being provided with appropriate longitudinally extending slots 9 to enable it to so expand under the influence of the cone, whereby the tube is constrained to partake of any rotative movement to which the post is subjected.

The leaf 5 of support S is formed of a piece of flat resilient metal, desirably spring steel, of suitable thickness which near one end is drilled to provide a hole to receive the upper end of the post, which is preferably somewhat reduced in diameter near its extremity so as to provide a shoulder forming a seat for the lower face of the leaf, the post and leaf being welded together at this point so as to hold the parts firmly in assembled relation. From its point of connection with the post the leaf is extended outwardly a short distance in a plane substantially normal to the axis of the former, thence bent upwardly on an arc approximating 90°, thence extended substantially parallel to said axis a short distance and finally bent around on itself to form an eye 10 terminating in a lip 11 lying substantially parallel to the adjacent straight portion of the leaf and spaced a short distance therefrom, the inner diameter of the eye being such as to readily receive the tubular handle bar when passed through the eye during the process of assembly before attachment of the grips G, usually of rubber or like material, to its ends. Means are also provided for constricting the eye about the center part of the handle bar so as to lock it firmly to the leaf in any position of rotative adjustment, said means as shown conveniently comprising a bolt 12 passing freely through a hole drilled in the lip and into a corresponding internally threaded hole in the adjacent straight portion of the leaf; thus when the bolt is backed off the handle bar may be turned to any desired position substantially about the axis of the eye and then secured therein by setting up on the bolt. Instead of threading the hole in the flat portion of the leaf it may be left unthreaded and a nut 13 positioned on the extremity of the bolt as shown in Fig. 3 so that by setting up on the nut like results insofar as securing the handle bar in adjusted position are obtained.

It will now be apparent that when the parts are constructed and assembled substantially as shown in Figs. 1 and 2 and as heretofore described, the handle bar receives its support solely from the resilient leaf 5 and that any vibrations and/or road shocks transmitted from the front wheel to steering tube 3 and thence to post 6 operatively united therewith will to a large extent be absorbed and dissipated in the element and the rider's hands and arms correspondingly relieved thereof, while of course by moving the handle bar in one direction or the other the bicycle may be steered by the rider in the ordinary way. It will further be appreciated that employment of my improved handle bar support requires no structural changes whatsoever in the frames or steering tubes of bicycles as customarily manufactured and, in fact, the support readily may be substituted in bicycles already in the hands of users for the usual supports of which mention has been made provided, of course, the external diameter of post 6 of my support is appropriate for reception in the steering tube.

Moreover it has been found in practice that despite the fact the resilient leaf is comparatively short and is so constructed that its legs or flat straight portions are connected by a zone approximating only 90° in curvature, its capacity for shock and vibration absorption is material and more than might normally be expected, while because of its extremely simple construction the cost of production of support S as a whole is much less than that of the customary type of support to which reference has been made.

Figure 3:
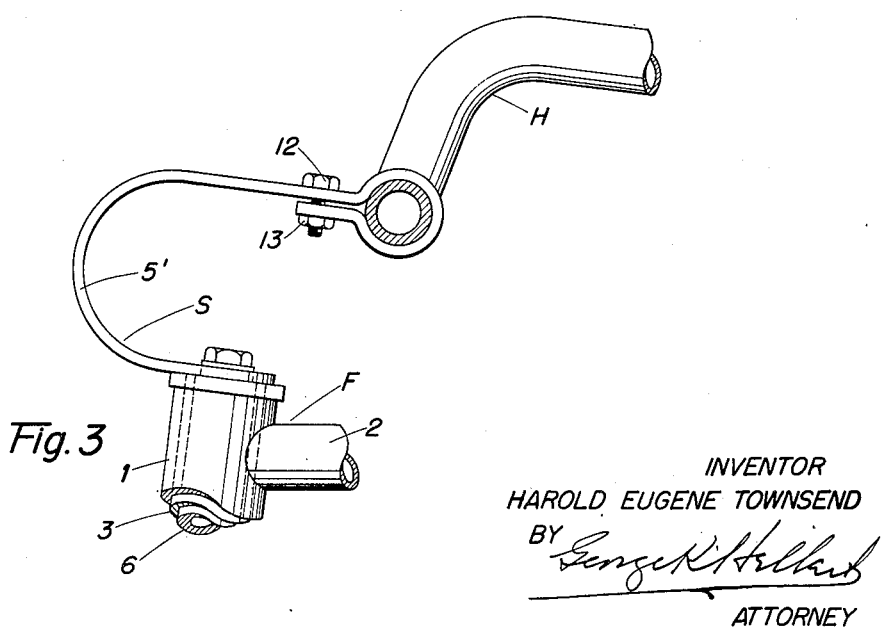
Fig. 3 is a view generally corresponding to Fig. 1 of the other said embodiment of the invention.

In Fig. 3 I have illustrated a slightly different embodiment of the invention comprising a resilient leaf 5' of even greater vibration and shock absorbing capacity than leaf 5 heretofore described, due to the fact that its curved zone substantially conforms to an arc of 180° whereby its two flat portions or legs lie in substantial parallelism instead of approximately normal to each other, the handle bar holding eye being formed in the free end of the upper leg. It results that the leaf as a whole is more flexible when made of spring steel or the like of the same width and thickness as leaf 5 and so forms an even more effective cushion between the handle bar and the post connected with the steering tube as will be apparent without more extended explanation since the other parts of the support are similar to those already described.

While I have herein disclosed two embodiments of my invention with considerable particularity, I do not thereby desire or intend to in any way specifically restrict or confine myself thereto as if desired changes and modifications may be made in the form, arrangement and method of assembly of the various parts without departing from the spirit and scope of the invention as defined in the appended claim.

Having thus described my invention I claim and desire to protect by Letters Patent of the United States:

A bicycle handle bar support comprising a post adapted to enter the steering tube within the front frame member of a bicycle and of reduced diameter proximate one end to thereby provide a shoulder normal to its axis, and a leaf of resilient metal receiving the reduced portion of the post, seating on said shoulder and fixedly secured to the post, said leaf extending outwardly from its connection with the post substantially normal to the axis of the latter, thence curving substantially through 90° into approximate parallelism with said axis, and thence reversely back upon itself to form an open eye adapted to surround the handle bar, the length of the flat portion of the leaf between said axis and its zone of curvature approximately equaling the distance between the other end of said zone and the center of said eye, and means operable to constrict the eye about said bar.

HAROLD EUGENE TOWNSEND.

REFERENCES CITED

The following references are of record in the file of this patent:

UNITED STATES PATENTS

| Number | Name | Date |
|---|---|---|
| 608,021 | Bille | July 26, 1898 |
| 2,357,553 | Schwinn | Sept. 5, 1944 |

FOREIGN PATENTS

| Number | Country | Date |
|---|---|---|
| 181,423 | Switzerland | Dec. 15, 1935 |
| 876,435 | France | Aug. 3, 1942 |